United States Patent [19]

Perrotta

[11] 4,342,730
[45] Aug. 3, 1982

[54] APPARATUS FOR AND METHOD OF REMOVING VOLATILE BOILER-FEED ADDITIVES FROM PRESSURIZED STEAM

[75] Inventor: Kenneth A. Perrotta, Salem, N.H.

[73] Assignee: Whatman Reeve Angel Limited, United Kingdom

[21] Appl. No.: 256,899

[22] Filed: Apr. 23, 1981

[51] Int. Cl.³ .......................................... B01D 53/34
[52] U.S. Cl. ............................ 423/215.5; 423/245; 55/387; 55/482; 55/486; 55/518; 55/524; 55/527; 210/506; 210/509; 210/497.01; 422/26; 422/298
[58] Field of Search ................. 423/215.5, 245; 55/74, 55/97, 387, 419, 482, 486, 518, 519, 524, 527, 528; 210/497.3, 501–506, 509; 422/211, 218, 312, 26, 298

[56] References Cited

U.S. PATENT DOCUMENTS

| | | | |
|---|---|---|---|
| 3,424,548 | 1/1969 | Gunther | 422/298 |
| 3,891,417 | 6/1975 | Wade | 55/387 X |
| 3,972,694 | 8/1976 | Head | 55/527 X |
| 4,058,456 | 11/1977 | Head | 55/524 X |
| 4,102,785 | 7/1978 | Head et al. | 55/524 |
| 4,210,540 | 7/1980 | Perrotta | 210/497.3 |

OTHER PUBLICATIONS

"Duolite Ion-Exchange Manual," Chemical Process Company, 1960, pp. 2, 3, 6, 7 & 8.
Perrotta et al., "Impurities in Steam to Hospital Sterilizers," presented at Chicago Association for Hospital Central Service Personnel Seminar, Jun. 18, 1981.

Primary Examiner—Earl C. Thomas
Attorney, Agent, or Firm—Richard P. Crowley

[57] ABSTRACT

An apparatus for and a method of removal of particulate material and boiler-feed additives from pressurized, saturated steam, which apparatus includes a composite cartridge in which particulate matter is removed by a filter tube and boiler-feed additives are removed by contacting the filtered steam with a bed of a hydrogen-form, strong-acid, ion-exchange resin, and saturated, pressurized steam substantially free of particulate matter and volatile, alkaline, boiler-feed additives are recovered for use, for example, in food-preparation and sterilization purposes.

5 Claims, 3 Drawing Figures

APPARATUS FOR AND METHOD OF REMOVING VOLATILE BOILER-FEED ADDITIVES FROM PRESSURIZED STEAM

BACKGROUND OF THE INVENTION

Pressurized, saturated steam, particularly centrally generated steam, can be used for many purposes, such as for air humidification, food preparation and for the sterilization of medical devices. The use of pressurized steam, particularly in hospital sterilizers, has given rise to problems, such as stained and spotted sterilized instruments, dirty sterilizers requiring frequent cleaning, malfunctioning of steam-controlled valves, and an excess of maintenance on sterilizer door seals and gaskets. A frequent cause of problems in hospital sterilizers in particular is poor-quality steam; that is, a pressurized, saturated steam that contains particulate matter, such as dirt from the piping system, pipe-scale rust, particles of packings and grease and oil, as well as liquid or condensed water carrying a wide range of contaminants therewith, such as boiler-feed additives, soluble salts and other organic material present in the boiler or water supply, and in addition includes other impurities, such as volatile boiler-feedwater additives, typically volatile alkaline additives, such as amines.

The problems associated with the use of steam, particularly in sterilizers; that is, caused by dirty steam, are often controlled or eliminated by filtering out the solid particulate material and the condensed water or other liquids out of the saturated steam, before the steam enters the sterilizer or is otherwise put to use. Usually, a steam filter is employed, which is an extremely efficient solids filter having a rating of 1 micron or better. Filter tubes composed of a plurality of nonwoven, randomly disposed, borosilicate-glass fibers, having a bonding agent at the fiber-crossover points to form a porous, self-supporting filter tube, have been employed within a filter housing, to provide for a filtered, saturated steam.

The filter tube also contains a bonding agent, such as a silicone resin or fluorocarbon resin, which may be used at the steam temperatures. The filter tube, for example, is placed within a housing within a cylindrical baffle. Unfiltered, saturated, pressurized steam enters the housing through an inlet port and is deflected around the centrifugal baffle, so that the change in direction causes much of the suspended water to drop to the bottom of the housing, from which it is removed automatically by a float-operated drain. The steam is essentially free of condensed water and passes through the walls of the filter tube from the outside inwardly, and filtered steam is removed from the inside of the filter tube through an outlet port and into the sterilizer for use. It has been found that an efficient filter tube can remove virtually all or a substantial portion of the particulate and nonvolatile, water-soluble impurities in saturated steam. However, it is desirable to provide an apparatus and a method for a very highly sterilized steam, particularly for use in hospital sterilizers.

SUMMARY OF THE INVENTION

My invention relates to an apparatus for and a method of preparing highly purified steam essentially free of contaminants and volatile boiler-feed additives. In particular, my apparatus comprises a composite-cartridge filter and a method for removing volatile alkaline amines employed as boiler-feed additives from filtered, pressurized steam.

I have discovered a method of preparing purified steam from steam which contains particulate matter and boiler-feed additives therein, which method comprises filtering the particulate and nonvolatile matter from a pressurized, saturated steam by passing the steam through a filter tube, which filter tube comprises a plurality of randomly disposed, nonwoven, inorganic fibers having interstices therebetween, to define the porosity of the filter tube, the fibers having a diameter of from about 0.1 to 10 microns, and bonded at the junction of the fiber-crossover points with a bonding agent, to form a porous, self-supporting filter tube, recovering filtered steam from said filter tube, passing the filtered steam through a bed of a hydrogen-form, strong-acid, ion-exchange, high-temperature, resin material, to provide for the reaction of the strong acid of the ion-exchange resin with volatile, alkaline, boiler-feed additives in the steam in an acid-base reaction, and recovering for use a purified, filtered, pressurized steam substantially free of alkaline, boiler-feed additives.

My invention also comprises a composite cartridge for the filtering and removing of particulate matter and boiler-feed additives, particularly volatile, alkaline, boiler-feed additives, such as amines, from saturated, pressurized steam, employing a composite cartridge which contains a filter tube to remove solid, nonvolatile, water-soluble impurities from the steam, and which contains a bed of hydrogen-form, strong-acid, ion-exchange resin material downstream of the filter tube, to remove the volatile, alkaline, boiler-feed or other alkaline materials from the steam, thereby providing for a pressurized, highly purified steam, particularly suitable for use in food preparation and in hospital sterilizers.

A wide variety of boiler-water additives is employed for various purposes, and in particular volatile, alkaline, boiler-feed additives are employed in boiler feedwater to control the pH of the condensate to minimize corrosion in the steam-distribution system and boiler system. Typical volatile amine additives which may be employed include, but are not limited to: cyclohexyl amine; diethylamino ethanol; hydrazine; morpholine; octadecyl amine; or combinations thereof. These volatile, boiler-feed additives have been found to be present in filtered steam. The solid, particulate impurities in the steam are and can be removed by the employment of a glass-fiber filter tube, while the nonvolatile additives used as boiler-feed additives are typically carried into the steam line in the entrained water and remain dissolved or suspended in the water. Therefore, a filter which effectively separates the condensate from the steam, before the steam enters the sterilizer used, will remove essentially or substantially all of the nonvolatile, feedwater additives.

However and importantly, it has been found that the volatile, boiler-feedwater additives are not removed, either in the condensed water or through the employment of a glass-fiber filter tube, alone. It has been discovered that an efficient, glass-fiber steam filter can remove virtually all of the solid impurities and the nonvolatile, water-soluble impurities from the steam; however, the glass-fiber filter tube has been found to remove only a small amount, if any, of the volatile amine additives present in the steam. The major portion of these volatile amines remains in the vapor phase in the steam and enters the sterilizer and contacts the contents with the filtered steam.

Thus, the volatile amines present in the filtered steam may be deposited on food during blanching or steam-cooking or on medical supplies, such as instruments or gauze, during sterilization. Steam containing such amines is also often used with a conditioned air supply, and the air is sometimes humidified by centrally generated steam, and, therefore, there is a possibility that such amine-contaminated steam may reach clean-rooms or critical areas of hospitals, including operating rooms, delivery rooms, recovery rooms and intensive-care units. A further concern is that some of the amines, such as morpholine, present in the steam may react with nitrites or other foodstuff additives, to form nitrosoamines or other compounds which may be or are potential animal carcinogens.

It has been found that volatile, alkaline materials, such as the volatile amines used as boiler-feed additives, may be removed effectively from filtered steam through the employment, directly downstream or adjacent to the filtering operation, of an ion-exchange resin in a strong-acid form. The ion-exchange resin, particularly in particulate form, should be composed of a high-temperature or steam-resistant polymer, such as styrene copolymers or the like, which is susceptible to use with steam, without degradation or substantial deterioration. The employment of the ion-exchange resin material removes the amine vapors present in the filtered steam, by the formation of a resin salt in a reaction analogous to an acid-base reaction. Thus, where a sulfonic-acid-type ion-exchange resin is employed, the volatile amines, such as morpholine and the like, react in an acid-base reaction, to form the resin salt of the polymer and water. Usually, pressurized steam is employed at a range of from about 15 to 90 psi in hospitals, and, therefore, the upper temperature limit of the ion-exchange resin to be employed in my invention is about 300° F. or higher, if possible, which would permit the steam to be purified, employing the ion-exchange resin at a pressure up to about 65 psi.

The ion-exchange resin employed should be of the strong-acid type, particularly in the hydrogen form, and not the sodium or potassium form, because it is desired to effect an acid-base reaction with the volatile, alkaline material in the pressurized steam. The use of boiler-feedwater additives used in the preparation of steam that will contact food has been recognized by the FDA, and upper limits have been set for particular, common additives, set forth in the Federal Register, Section 173.310(d), entitled "Boiler Water Additives," hereby incorporated by reference.

In my method and apparatus, the filtered steam is directed to and passes through a bed of ion-exchange resin of sufficient depth, to permit the reaction of all or essentially all of the volatile amines in an acid-base reaction with the strong acid on the ion-exchange resin, so that the pressurized steam recovered, after passing through the bed, is essentially free of a volatile, alkaline material or contains only very minor traces of such materials; for example, less than 3 ppm. The ion-exchange resin is typically in bead or other particular form, and may be placed in a separate container and spaced apart from, and downstream of, the steam filter tube, but more desirably is directly adjacent the filter tube, so that filtration and neutralization of the steam occur within a single, composite cartridge, as more particularly will be described hereafter. Such cartridge is normally employed in a housing, to permit the change in direction of the steam and the removal of condensed water from the housing drain, with the pressurized steam then passing through the walls of the filter tube and, thereafter, through the bed of strong-acid, ion-exchange resin.

In one embodiment, a strong-acid, ion-exchange resin is placed inbetween two glass-fiber filter tubes or one upstream filter tube and a downstream, porous, tubular retainer or support, whereby the saturated steam is passed through one wall of the filter tube, is neutralized by passing through the ion-exchange bed and is further filtered or passed through the wall of the filter tube or retainer on the opposite side of the bed. For example, the filter tube may be arranged concentrically, with the inside of the inside filter tube supported by a perforated core, with the flow of the steam being from the outside to the inside, and the purified steam is removed from the inside of the concentric filter tube, which combination forms a composite cartridge.

In another embodiment, the ion-exchange resin may be placed directly adjacent a filter tube or a series of filter tubes in a siolid-bed form; for example, directly downstream of the filtered steam, so that the saturated steam, containing the impurities, is filtered by passing it through the walls of a glass-fiber filter tube, and, thereafter, passes through a solid particulate bed of ion-exchange resin directly downstream of the filter tube; for example, where the bed is axially aligned therewith, and the filtered, highly purified, neutralized steam is removed from the solid, ion-exchange bed.

The filter tubes suitable for use include those filter tubes which are composed of a plurality of inorganic fibers, such as glass and typically borosilicate-glass fibers or alumina or zirconia fibers, randomly disposed to form a porous, self-supporting filter tube, with the diameter of the fibers ranging from about 0.01 to 10 microns; for example, 0.03 to 8 microns, and typically 0.1 to 4 microns, the fibers arranged so that the interstices between the fibers define the porosity of the filter tube, and with the crossover points of the fibers in the filter tube containing a bonding agent, such as a hardened material, and typically a hardened resin material, such as a silicone or fluorocarbon resin, which bonding material would be impervious or not degraded by the steam in use. A typical glass-fiber filter tube, employing a fluorocarbon bonding agent, suitable for use in the invention and in the composite cartridge, which is defined herein, is set forth in U.S. Pat. No. 4,210,540, issued July 1, 1980, hereby incorporated by reference.

My invention will be described in connection with certain illustrative embodiments; however, it is recognized that various changes, modifications and improvements therein may be made by those persons skilled in the art, all without departing from the spirit and scope of my invention.

DESCRIPTION OF THE EMBODIMENTS

Figure 1:
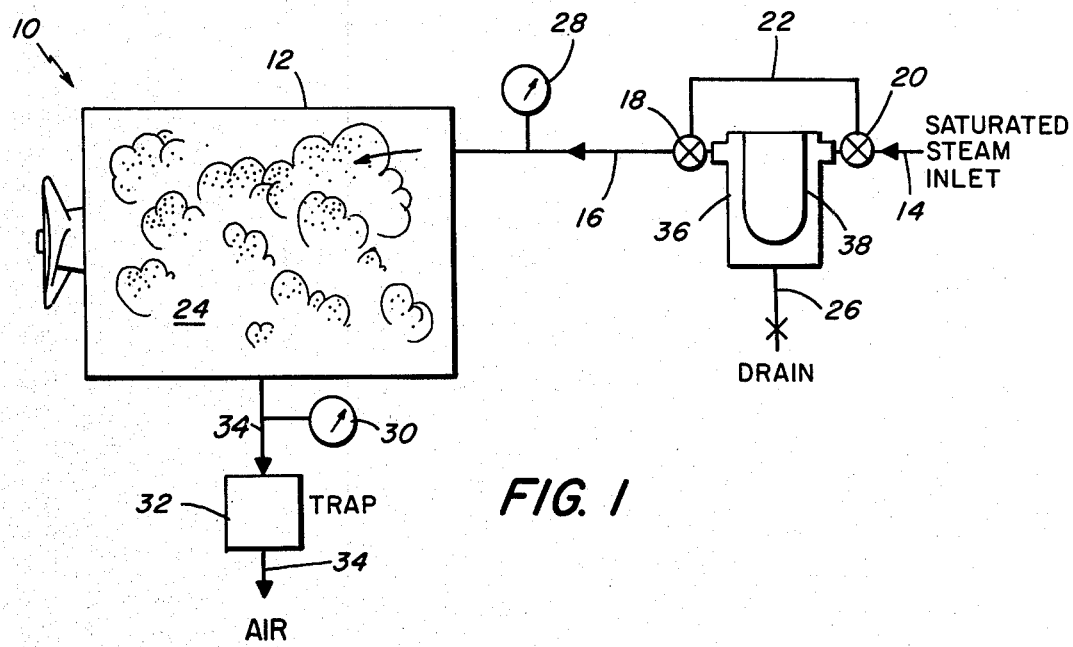
FIG. 1 is an illustrative system for the furnishing of filtered, highly purified steam to a sterilzer, employing a composite cartridge of the invention.

FIG. 1 illustrates a system for the supply of highly purified, pressurized steam, which system 10 comprises a pressure vessel 12, such as a hospital sterilizer, a housing 36 for a composite cartridge filter 38, which housing includes a drain 26, such as an automatic drain. The housing is secured to a pressurized, saturated-steam inlet line 14 and an outlet line 16, with three-way valves 18 and 20 in the respective lines, and having a bypass line 22, with the outlet line including a pressure gauge 28. The pressure vessel 12 includes therein sterilized, filtered, pressurized steam 24, and the vessel includes a vessel outlet line 34 including a pressure gauge 30, which contains a trap 32 which passes an air-and-steam mixture and retains pure steam, which trap discharges air to the atmosphere.

In operation, a pressurized, saturated steam is introduced to inlet 14 and into the housing 36, and exterior of the outer wall of the composite cartridge 38, a cylindrical baffle (not shown) exterior of and spaced apart from the cartridge is optional, the steam passing through the cartridge 38 and out the outlet through valve 18 and line 16 into the pressurized vessel 12 as highly purified, pressurized steam 24. The automatic drain 26 discharges water, containing nonvolatile, boiler additives, from the saturated steam from the housing. Condensed water is passed through the trap 32.

Figure 2:
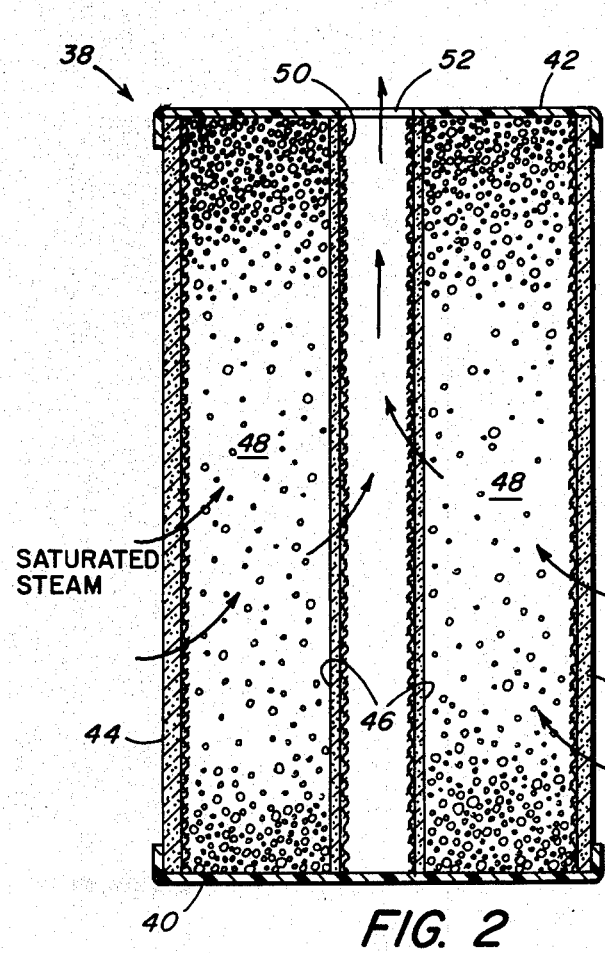
FIG. 2 is an illustrative, cross-sectional view of a composite cartridge of the invention.

FIG. 2 is a cross-sectional, illustrative embodiment of a composite cartridge useful in the system 10 of FIG. 1, which composite cartridge 38 includes fitted or sealed end caps 40 and 42, an outer filter tube 44 composed of borosilicate-glass fibers, with a silicone or fluorocarbon resin-bonding agent, and another internal, borosilicate-glass-fiber, inner filter tube which may be the same or different from the filter tube 44, and contained within the filter tubes 44 and 46 is a bed 48 of a sulfonic-acid, ion-exchange resin in particulate or bead form. A stainless-steel mesh or other porous support core 50 is employed, while the end cap 42 includes an outlet for steam, while end cap 40 closes off the bottom of the support core. The flow of the steam is schematically illustrated by the flow arrows.

In operation, saturated steam passes through the wall of the filter tube 44 through resin bed 48 and through the wall of filter tube 46 and into the interior passageway, and is discharged out outlet 52 as highly purified, filtered, pressurized steam ready for use in a hospital sterilizer.

Figure 3:
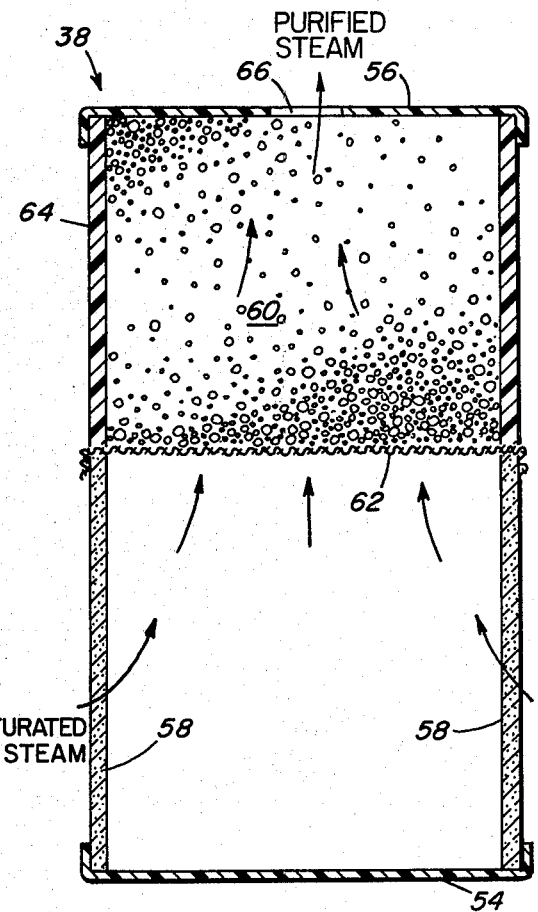
FIG. 3 is an illustrative view of another composite cartridge of the invention.

FIG. 3 is an illustrative, sectional view of another composite cartridge of the invention, which includes end caps 54 and 56, with end cap 56 having a steam outlet 66, and with end cap 54 being imperforate. A glass-fiber filter tube 58 is employed in the lower portion of the cartridge, while a bed of ion-exchange resin beads 60 is formed directly above the axial line as part of the composite cartridge. An open-mesh, porous, support grid 62, such as of stainless steel, separates and retains the ion-exchange resin from the interior of the filter tube 58. The ion-exchange resin is retained in a tubular, nonporous, plastic, sleeve element 64.

In operation, pressurized, saturated steam passes through the walls of the filter 58 at the lower portion of the composite cartridge which is in the housing, and the passes upwardly through the center of the filter tube to the porous, support, open-mesh material 62 and through the tubular bed of particulate, acid, ion-exchange resin 60, and the highly sterilized, filtered, pressurized steam is then discharged from the top outlet 66.

EXAMPLE 1

195 grams of Amberlite (a registered trademark of Rohm & Haas Co.) 200 CH, strong-acid, ion-exchange resin were filled into the annular space between two hardened resin bonded glass-fiber filter tubes of 0.75" in diameter and 2.00" in diameter. End caps were then potted on and the entire cartridge was installed in a steam-filter housing. The housing had been installed previously in a steam-distribution system, with a working pressure of 10 to 15 psig steam. Morpholine was then added to the boiler, feeding the system in an amount sufficient to generate 3 ppm by weight in the steam condensate. Samples of the steam condensate were taken upstream and downstream of the housing, by bleeding steam through a copper coil cooled with water. Glass collection bottles, which had been rinsed previously with distilled water, were used to collect the condensate. Using a Taylor Water Analyzer Kit No. 1300, the concentration of morpholine in ppm by weight was determined. In the test used, morpholine reacts with carbon disulfide to form a thiocarbamate compound. This carbonate reacts with excess copper ion to form a brown-colored compound, with the intensity of the brown color being proportioned to the concentration of morpholine present.

The results were as follows:
Concentration upstream filter—3.0 ppm
Concentration downstream filter—0.2 ppm

EXAMPLE 2

After 24 hours had elapsed, the procedure in Example 1 was repeated, and the results were as follows:
Concentration upstream filter—2.0 ppm
Concentration downstream filter—0.2 ppm

EXAMPLE 3

Example 1 was repeated, but the ion-exchange filter cartridge was removed from the system, with no other changes. The results were as follows:
Concentration upstream—1.5 ppm
Concentration downstream—1.5 ppm

EXAMPLE 4

Boiler-feedwater additives fall generally into the following categories: binding agents for calcium, magnesium and silicon, to prevent solids from plating out on the hot tube walls (examples of these materials are sodium tripolyphosphate, sodium alginate and tetrasodium EDTA (a chelating agent)); oxygen scavengers to retard tube corrosion, which can be accelerated by dissolved oxygen in the feedwater (examples are sodium sulfite and hydrazine); and alkaline buffers to keep the pH of the feedwater in the desired range; for example, 6.5 to 8.5.

In practice, steam condensate is encountered at pH9 or even higher. Sodium carbonate, sodium aluminate, morpholine and cyclohexyl amine are some materials used as alkaline buffers. The latter two products have the advantage of being volatile, and, therefore, they can protect the entire steam-distribution system and condensate return lines from acidic corrosion.

Further boiler-feedwater additives are volatile corrosion inhibitors which form a protective film on pipes or other metal surfaces. Octadecyl amine, a long-chain fatty amine, is typically added to boiler feedwater for this purpose.

Nonvolatile additives constitute the great bulk of the boiler-feedwater additives. The nonvolatile additives are carried into the steam line in the entrained water, and they remain dissolved or suspended in the water. Therefore, a filter which effectively separates condensate from steam, before the steam enters the sterilizer, will remove essentially all of the nonvolatile feedwater additives.

To obtain quantitative information on concentrations of volatile amines in the steam to hospital sterilizers, analytical determinations on the steam system of a hospital, which uses morpholine as one of its boiler-feedwater additives, were made. The testing was done at a sterilizer which has a filter housing containing a fluorocarbon resin bonded glass-fiber filter tube on the steam line. Tests were made on six days over about a one-month period. Each result is the average of two or three determinations. Steam was sampled both upstream and downstream of the filter tube, which is located immediately upstream of the sterilizer steam inlet. The concentration of morpholine inside the sterilizer was the same as the concentration downstream of the filter. The concentration of morpholine in the boiler feedwater, itself, was also determined. The test results are:

| Date Days | Boiler Feedwater | Morpholine Concentration, ppm | |
|---|---|---|---|
| | | Upstream of Filter | Downstream of Filter |
| November 19 | — | 2.6 | 1.8 |
| November 20 | — | 2.9 | 2.0 |
| November 24 | 4.0 | 4.0 | 3.2 |
| December 1 | — | 5.5 | 4.0 |
| December 19 | — | 4.2 | 3.6 |
| December 22 | — | 3.5 | 2.5 |

On the average, the filter tube reduced the morpholine concentration in the steam by about 25%, presumably by removing the liquid water in which some of the morpholine is dissolved. However, the major portion of the morpholine remained in the vapor phase and entered the sterilizer with the filtered steam.

Thus, while an efficient, steam, glass-fiber filter tube can remove virtually all solid impurities and nonvolatile water-soluble impurities from the steam, the filter will remove only about one-fourth of the volatile amines in the steam, while, as demonstrated, the employment of a bed of strong-acid ion-exchange resin immediately downstream of the filter removes the volatile, alkaline additives from the filtered steam.

What I claim is:

1. A method of preparing purified, saturated, pressurized steam from pressurized, saturated steam which contains particulate matter and a volatile, alkaline boiler-feed additive therein, which method comprises:

(a) passing the saturated, pressurized steam through the wall of a filter tube, which filter tube comprises a plurality of randomly disposed, nonwoven, inorganic glass fibers having interstices therebetween, to define the porosity of the filter tube, the fibers having a diameter of from about 0.001 to 10 microns, and bonded at the junction of the fiber-crossover points with a bonding agent selected from the group consisting of hardened silicon or fluorocarbon resins to form a porous, self-supporting filter tube to filter the particulate matter from the pressurized saturated steam;

(b) passing the particulate-free, filtered, pressurized saturated steam directly downstream through a bed of hydrogen-form, sulfonic acid, ion-exchange resin material, the resin material composed of a high temperature, steam resistant polymer, the resin material having a sufficient bed-depth to provide for the reaction of the strong acid hydrogen of the sulfonic acid ion-exchange resin with the alkaline, volatile, boiler-feed additive in the steam in an acid-base reaction, the saturated steam having a pressure of from about 15 to 90 psi; and, (c) recovering a filtered, purified, saturated, pressurized steam essentially free of particulate matter and having less than about 3 parts per million of volatile, alkaline, boiler-feed additive therein.

2. The method of claim 1 wherein the volatile, alkaline, boiler-feed additive is selected from the group consisting of cyclohexyl amine, diethylamino ethanol, hydrazine, morpoline, octadecyl amine and combinations thereof.

3. The method of claim 1 passing the pressurized saturated steam through the wall of a filter tube, thereafter directly axially upstream or downstream through a bed of the hydrogen-form sulfonic-acid ion-exchange resin material.

4. The method of claim 1 wherein the glass fibers of the filter tube comprise a borosilicate-glass fibers having a diameter from about 0.03 to 8 microns.

5. The method of claim 1 which includes passing the filtered steam from the filter tube directly through the wall of another filter tube on the opposite side and adjacent to the bed of the ion-exchange resin, whereby the saturated steam passes first through the one wall of the filter tube, through the ion-exchange resin bed, and thereafter directly through another adjacent wall of another filter tube.

* * * * *